United States Patent [19]
Schmidt et al.

[11] Patent Number: 4,730,880
[45] Date of Patent: Mar. 15, 1988

[54] EQUIPMENT STAND, PARTICULARLY FOR DENTAL IMPLEMENTS

[75] Inventors: Helmut Schmidt; Anton Bodenmiller, both of Leutkirch; Alfred Straka, Isny, all of Fed. Rep. of Germany

[73] Assignee: Kaltenbach & Voigt GmbH & Co., Biberach an der Riss, Fed. Rep. of Germany

[21] Appl. No.: 666,883

[22] Filed: Oct. 31, 1984

[30] Foreign Application Priority Data

Nov. 2, 1983 [DE] Fed. Rep. of Germany ....... 3339656

[51] Int. Cl.[4] ............................................. A47B 81/00
[52] U.S. Cl. .................................... 312/209; 248/125; 248/158; 312/223; 433/32; 433/49
[58] Field of Search ............... 312/209, 223, 236, 237; 108/23, 50; 248/121, 558, 129, 122, 408, 407, 412, 283, 296, 337, 354.6, 127, 158; 433/25, 32, 49, 77; 431/153, 256, 343

[56] References Cited

U.S. PATENT DOCUMENTS

| | | | |
|---|---|---|---|
| 553,572 | 1/1896 | Stafford | 433/32 X |
| 618,421 | 1/1899 | Kirkwood | 433/32 |
| 724,434 | 4/1903 | Cavanagh | 431/343 |
| 1,000,785 | 8/1911 | Cunningham et al. | 433/32 |
| 1,719,306 | 7/1929 | Pieper et al. | 433/32 X |
| 2,301,661 | 11/1942 | Wiedenhoeft | 248/121 X |
| 2,970,701 | 2/1961 | Fetter | 248/121 |
| 3,454,252 | 7/1969 | Morgan et al. | 248/121 X |
| 3,708,203 | 1/1973 | Barecki et al. | 248/408 X |
| 4,026,026 | 5/1977 | Richardson | 433/77 X |
| 4,181,037 | 1/1980 | Boon et al. | 312/125 X |
| 4,306,749 | 12/1981 | Deloustal | 248/408 X |

FOREIGN PATENT DOCUMENTS

| | | |
|---|---|---|
| 8258886 | 2/1961 | Fed. Rep. of Germany . |
| 1910500 | 10/1964 | Fed. Rep. of Germany . |
| 6913932 | 9/1970 | Fed. Rep. of Germany . |
| 7428439 | 3/1975 | Fed. Rep. of Germany . |
| 2554477 | 6/1977 | Fed. Rep. of Germany . |
| 7825167 | 12/1978 | Fed. Rep. of Germany . |
| 7908672 | 9/1979 | Fed. Rep. of Germany . |
| 2821969 | 11/1979 | Fed. Rep. of Germany ........ 433/77 |
| 579856 | 1/1973 | Switzerland . |

OTHER PUBLICATIONS

"Dental-Gerate", Universal Machine D-FU 222, Hannisch Rieth, 5/1983, 2 pages.
Siemens, Rona 2000 E, 2 pages.
EMDA, Support Stand, 6 pages.
Dental Products Report, Jan./Feb. 1981, cover page.
Martin Gasbrenner, Lot-und Schmelzpistolen, cover page, p. 7, and end sheet.

*Primary Examiner*—Peter A. Aschenbrenner
*Assistant Examiner*—Thomas A. Rendos
*Attorney, Agent, or Firm*—Scully, Scott, Murphy & Presser

[57] ABSTRACT

An equipment stand, in particular for dental implements, which consists of a carrier possessing holders for the dental implements or instruments. A stand which extends in a vertical direction, concurrently forms the carrier possessing the implement holders, so as to thereby eliminate a separate component as a carrier in the form of a cross-bar, and consequently avoids a complex construction. Furthermore, through a superimposed arrangement of the implement holders there is afforded a good overview of the implements which are located in the holders.

34 Claims, 19 Drawing Figures

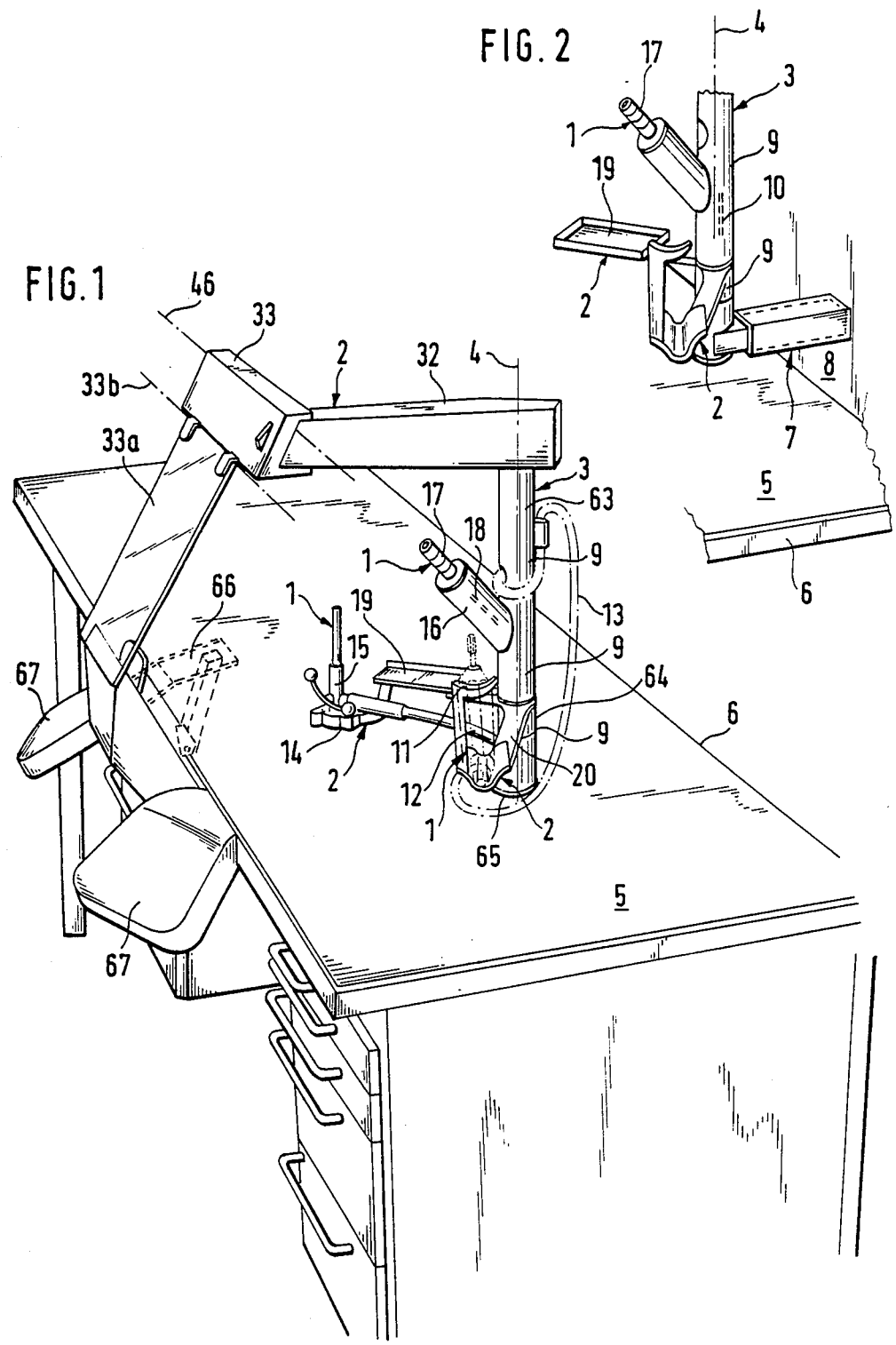

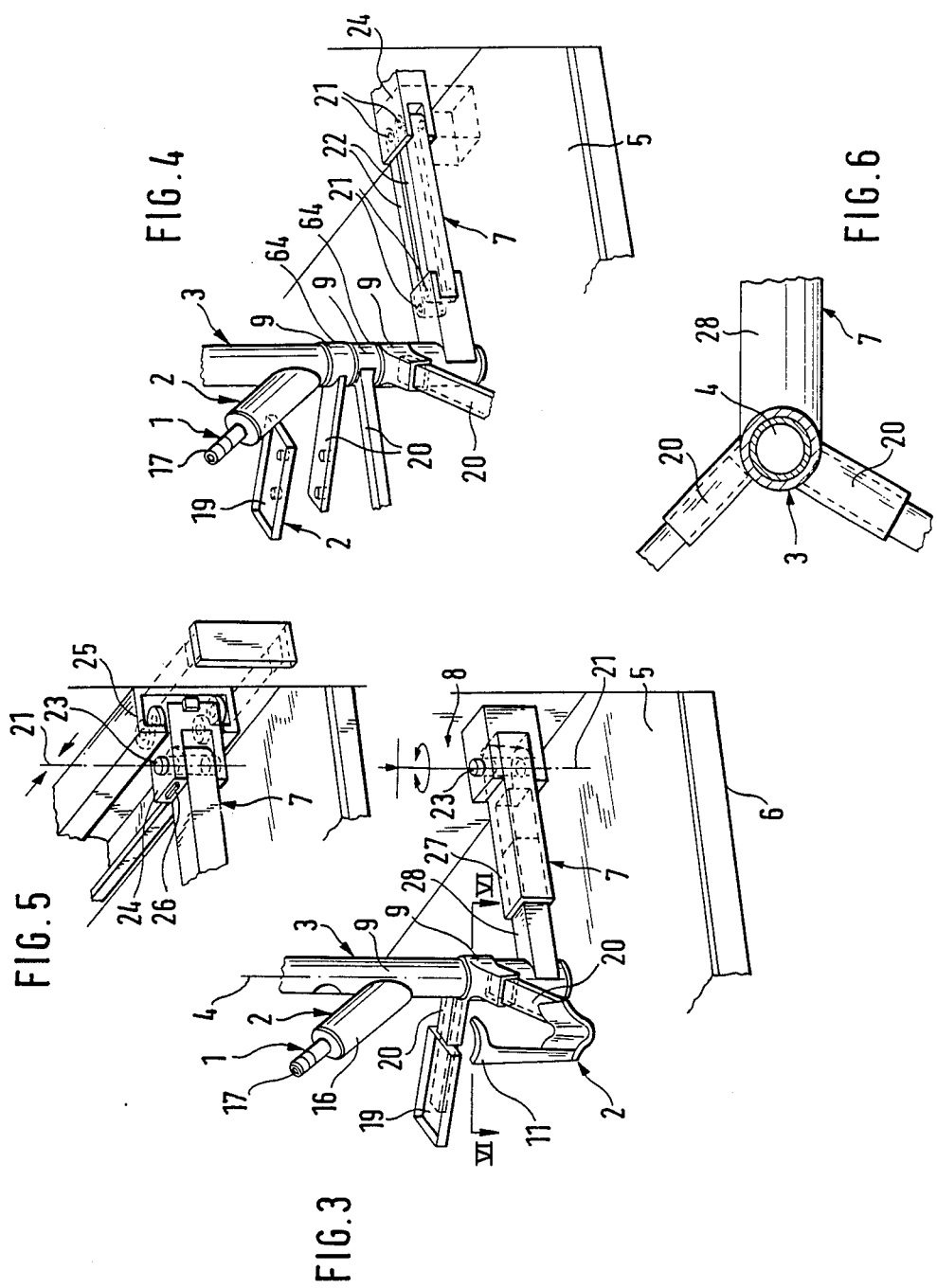

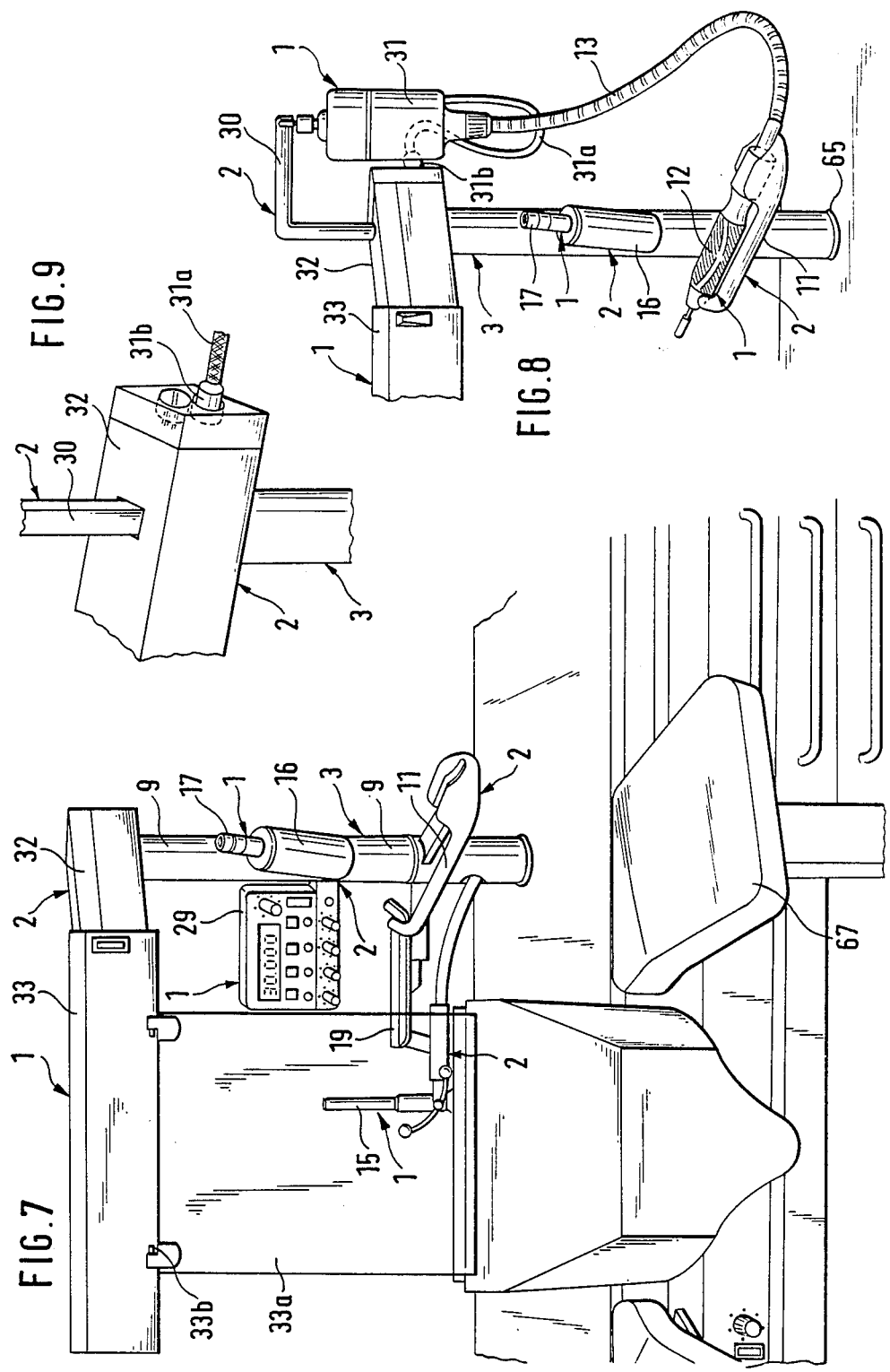

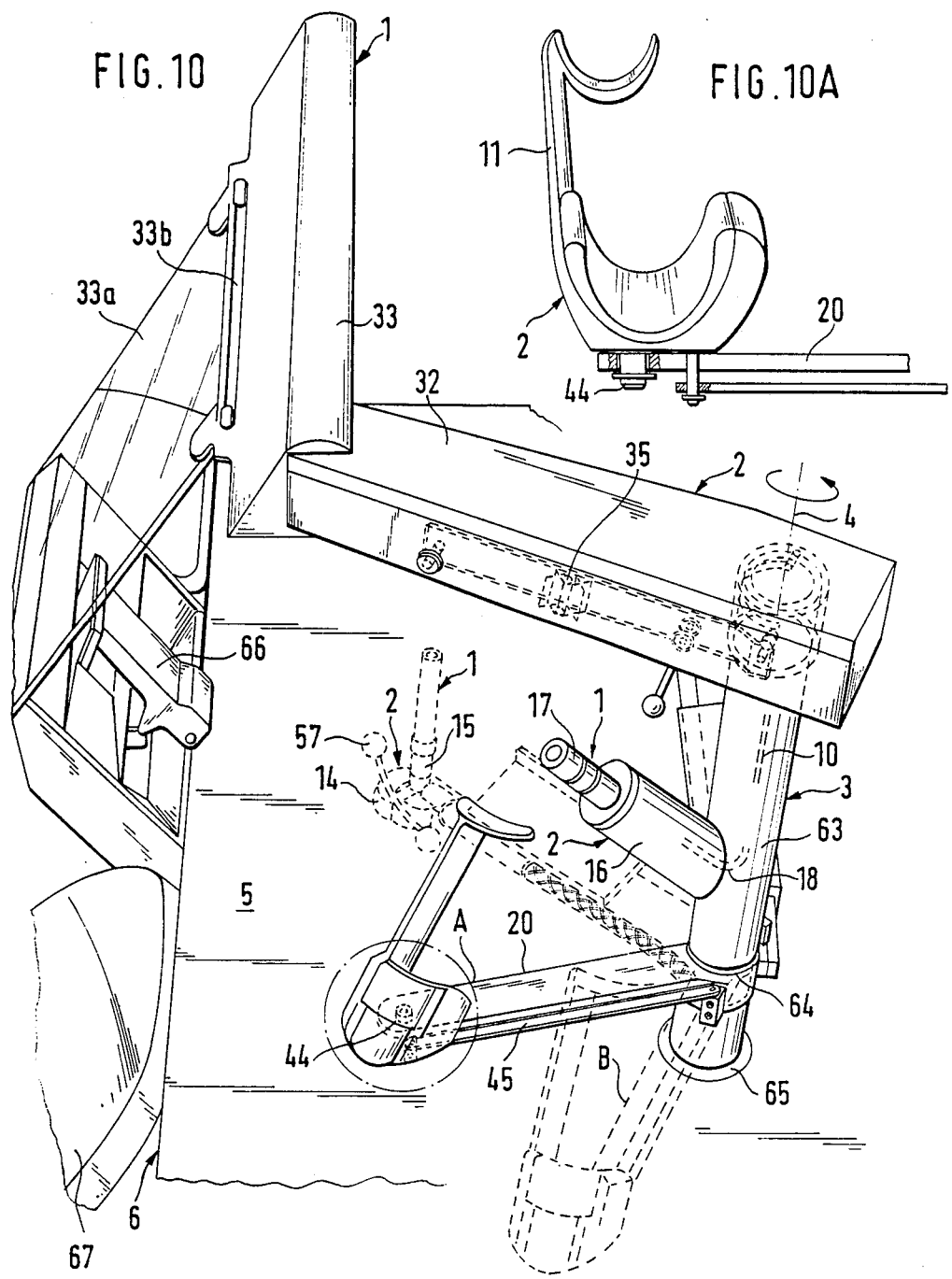

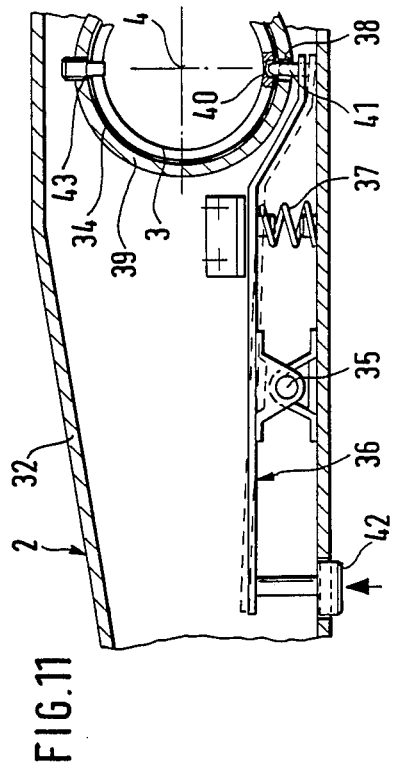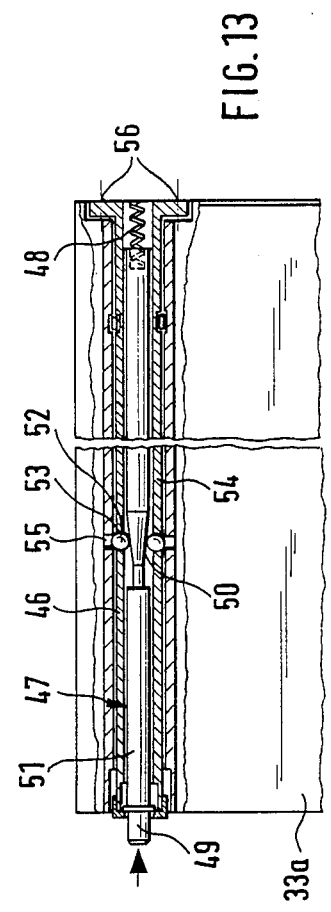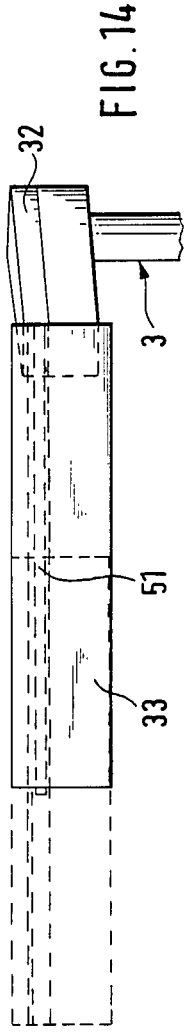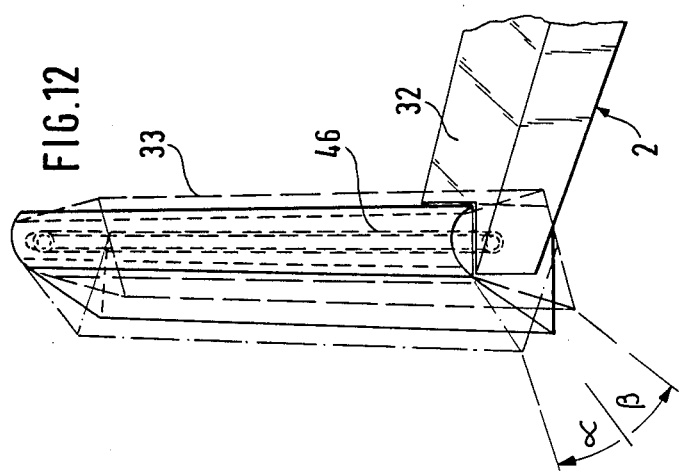

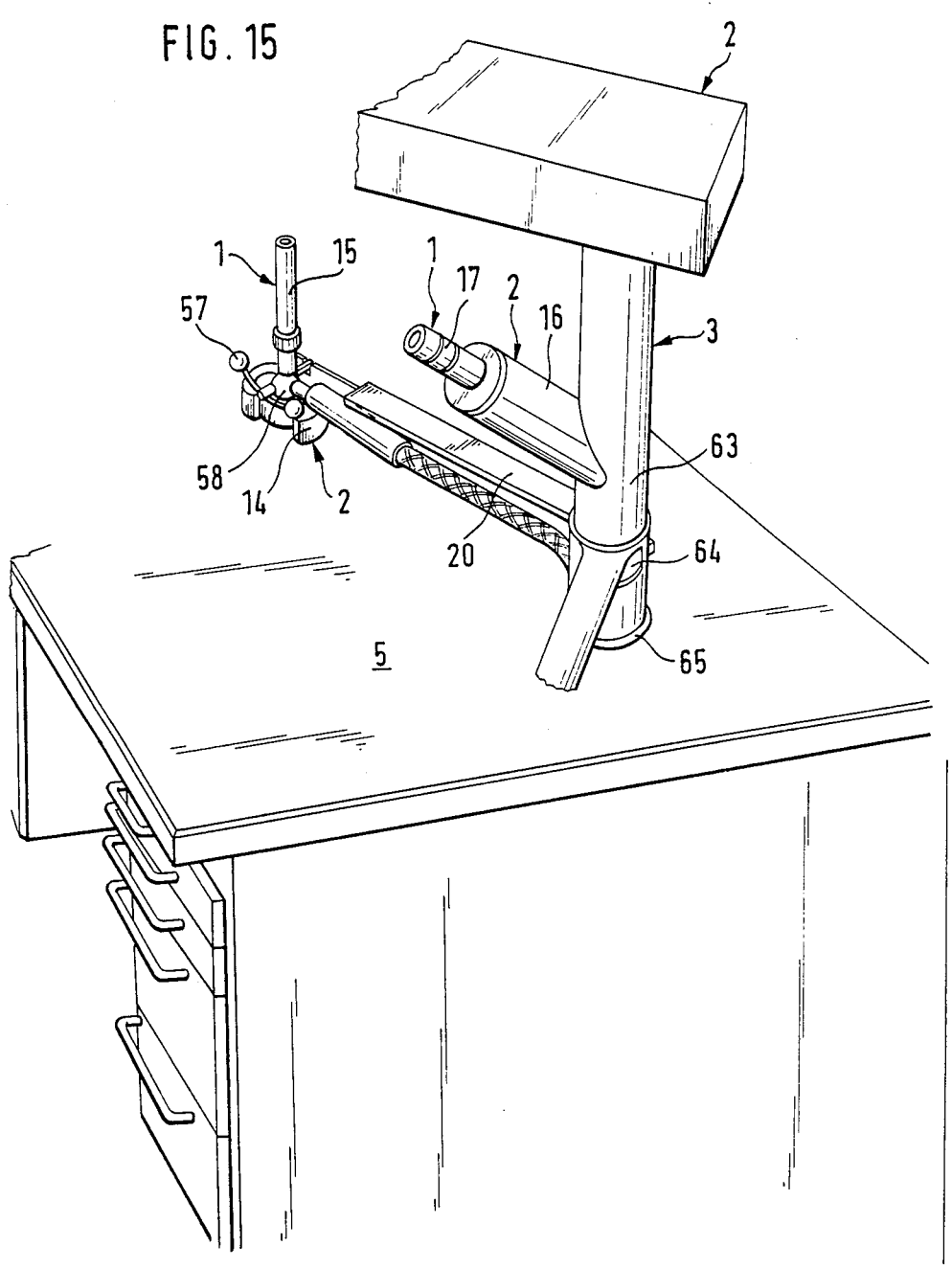

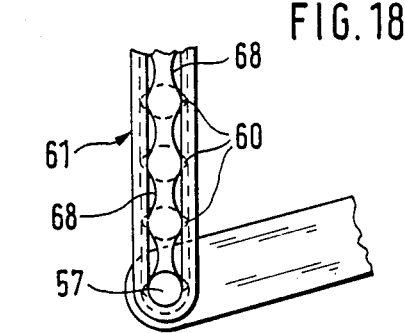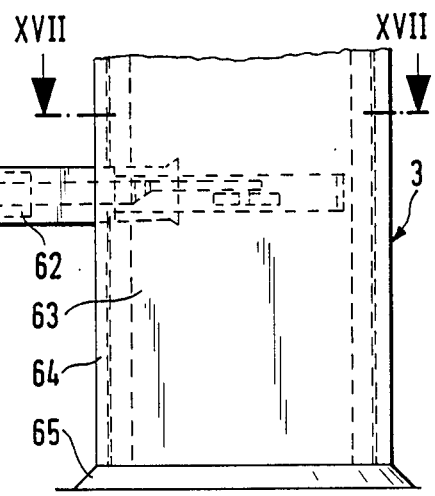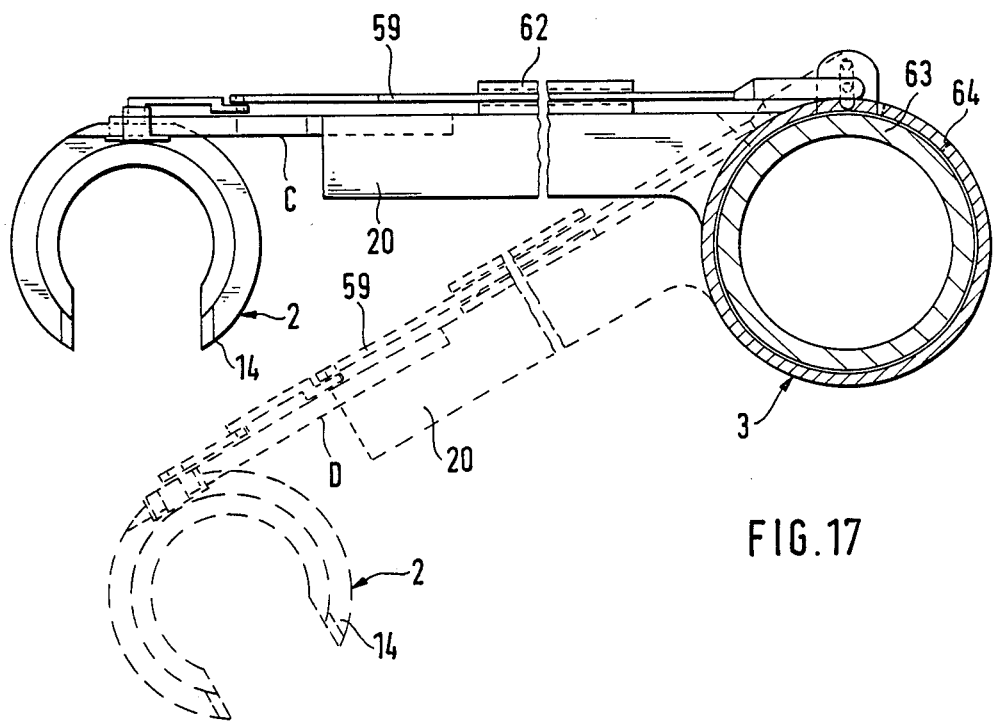

EQUIPMENT STAND, PARTICULARLY FOR DENTAL IMPLEMENTS

BACKGROUND OF THE INVENTION

1. Field of the Invention

The present invention relates to an equipment stand, in particular for dental implements, which consists of a carrier possessing holders for the dental implements or instruments.

2. Discussion of the Prior Art

An equipment stand of that type has become known from the publication "Dental Products Report" January/February 1981, page 92. This known equipment stand for dental implements is constructed in a bracket or gallows-shape and possesses a base portion extending upwardly in a vertical direction from the table top of a work table or bench, and a horizontal arm continuing through a bend into the base portion. Provided at the free end of the horizontal arm is a separate horizontally extending cross-bar, which is transverse to the horizontal arm and which forms a carrier for the implement holders. Hereby, the implement holders are arranged sidewise adjacent each other on the carrier which is formed by the cross-bar. Besides possessing a relatively complex construction, there is hereby afforded a relatively difficult or restricted overview of the implements, which are contained in the holders, and a mutual hindrance is encountered during the depositing and withdrawing of the implements in and from the holders. For example, when an implement is constituted of a pressure gauge and the neighboring implement of a dental handpiece, this will block the view of the gauge, particularly from the side. On the other hand, there can easily be encountered confusions with regard to the implements which are located in the neighboring holders, in particular when this relates to differently operating dental handpieces.

SUMMARY OF THE INVENTION

Accordingly, it is an object of the present invention to ameliorate or eliminate the disadvantages encountered in prior art constructions, through the provision of an equipment stand of the above-mentioned type which, while affording a simple construction, avoids any hindrances during the depositing and withdrawing of the implements in and from the holders, and also ensures a good overview of the implements which are located in the holders.

The advantages attainable through the present invention can be essentially ascertained in that the column or stand which extends in a vertical direction, concurrently forms the carrier possessing the implement holders, so as to thereby eliminate a separate component as a carrier in the form of a cross-bar, and consequently avoids a complex construction. Furthermore, through a superimposed arrangement of the implement holders there is afforded a good overview of the implements which are located in the holders. Moreover, through the above-mentioned satisfactory superposition affording ready accessibility thereto for handling there is avoided any hindrance during the depositing and withdrawing of the implements in and from the holders. Finally, there is also eliminated any mixups or confusion of implements, since it has been evidenced that the servicing person can more readily note the applicable arrangement of locations for holders which are provided in sequence in height, than for holders which are located sideways near each other.

BRIEF DESCRIPTION OF THE DRAWINGS

Further advantageous features and modifications of the invention can be ascertained from the following detailed description of exemplary embodiments thereof, taken in conjunction with the accompanying drawings; in which:

FIG. 1 illustrates a perspective view of an inventive equipment stand which is positioned on the table top of a work table;

FIG. 2 illustrates a perspective view of an equipment stand which is supported from a chamber wall;

FIGS. 3 tnrough 5 respectively illustrate modified embodiments relative to that illustrated in FIG. 2;

FIG. 6 illustrates a sectional view taken along line VI—VI in FIG. 3 of a modified embodiment;

FIG. 7 illustrates an equipment stand with modified implement holders or instruments shown in a perspective view;

FIG. 8 illstrates a modified embodiment relative to that of FIG. 7;

FIG. 9 illustrates a fragmentary detail from FIG. 8;

FIG. 10 illustrates a perspective view of an equipment stand with horizontally or vertically pivotable implement holders;

FIG. 10a illustrates a pivotable equipment support as a receiving element for an implement constructed as technical handpiece, shown partly in section through the pivot axis and for the remainder in a plan view;

FIG. 11 illustrates a sectional view, as in FIG. 10, of a cantilever-like retaining element for an implement holder configured to provide an implement-forming illuminating member;

FIG. 12 illustrates a perspective view of the illuminating member in a plurality of pivoted positions;

FIG. 13 illustrates a sectional view through the illuminating member which is provided with a protective screen or shield;

FIG. 14 illustrates a plan view of the removably arranged illuminating member

FIG. 15 illustrates a perspective view of the implement holder formed as a receiving element for a gas burner constituting an implement;

FIG. 16 illustrates a side elevational view of the equipment stand incorporating the receiving element for the gas burner;

FIG. 17 is a sectional view taken along line XVII—XVII in FIG. 16; and

FIG. 18 illustrates a fragmentary detail from FIG. 16.

DETAILED DESCRIPTION

Referring now in detail to the drawings, the illustrated equipment stand consists of a carrier or support 3 incorporating holders 2 for dental implements or instruments 1. The carrier 3 is constructed as a type of column exclusively extending in the vertical direction, whereby the implement holders 2 are arranged above each other.

The columnar support 3 is arranged so as to be rotatable about its vertical axis 4.

For instance, in the embodiment pursuant to FIGS. 1, 7, 8, 10, 15 and 16, the columnar support 3 is arranged on a table top 5 of a worktable or bench 6.

In the embodiments pursuant to FIGS. 2, 3, 4, and 5, the columnar support is mounted on a wall 8 of the work chamber. Hereby, the support 3 is fastened through the intermediary of a horizontal arm 7 to a wall 8 proximate the worktable 6. The columnar support can hereby be positioned without being supported on the table top, at a distance above the table top 5.

The implement holders 2 are presently pivotable either individually or commonly jointly with regard to the columnar support 3 about the axis 4 of the latter. For example, two implement holders 2 can be jointly pivotable about the axis 4 such that in the one pivoted end position of the implement retained by one implement holder is in its operative position, and the implement retained by the other implement holder is in its inoperative position. The reverse is then applicable in the other pivoted end position. With respect to the implements 1 which are currently located in their inoperative position, especially when this relates to a drill, cutter, or the like, there is no danger of any injury to the operating person.

For example, as is illustrated in FIG. 7, the jointly pivotable implement holders 2, in the illustrated case the two lower holders, can be arranged at the same height with a horizontal spacing between each other.

For instance, from FIGS. 1 and 7 there can be ascertained that the columnar support 3 consists of a plurality of column sections forming individual modules 9, and which possess a plurality of implement holders 2. The individual modules 9 are pivotable individually, or a plurality thereof jointly, about the axis 4 of the columnar support 3. For example, in order to adapt the equipment stand for an operating person who is left-handed, the individual modules 9 can be interchanged amongst each other; in effect, an individual module 9 can be positioned which possesses an instrument holder 2 suitable for a left-handed person.

The columnar support 3 is constructed hollow in order to be able to receive conduits 10; for example, energy supply or media conduits.

The implement holders 2 can be imparted a configuration which is suitably correlated for the receiving of different types of implements 1. Thus, a few of the implement holders 2 are formed as plug-shaped or bifurcated receiving elements 11 for removable technical handpieces 12 constituting the implements 1, with internally or externally arranged drive or supply conduits 13. To the extent that the conduit 13 is located externally, the guidance of the conduit leads from above downwardly so as to at all possibly avoid any disturbances or hindrances.

Other implement holders 2 are configured as bifurcated or tray-like receiving elements 14 for suitably detachable gas, burners 15, for example, Bunsen burners, constituting the implements 1. The gas supply hose can be arranged interiorly of the support 3. At an extendable arrangement, the gas burner can be readily deposited on the table top 5.

In turn, other implement holders 2 are constructed as cup or cylinder-shaped receiving elements 16 for extendable air nozzles 17 constituting the implements 1, with a similarly extendable air supply hose 18. Hereby, the cylinder-like receiving elements 16 are located generally at the middle height of the columnar support 3. The arrangement is suitably such that, upon the pulling out or extending of the nozzle 17 from the cylindrical receiving element 16, there is automatically activated a suctioning device.

Furthermore, other implement holders 2 are constructed as tablet-shaped receiving element 19 for work tools, work materials, operating media or the like, forming the implements 1. The bifurcated or pan-shaped receiving elements 14 can be structurally combined with the tablet-shaped receiving elements 19.

As illustrated in the drawing, the implement holders 2 are presently supported by means of a radial, horizontal carrying arm 20 on the columnar support 3.

As can be ascertained, for example from FIG. 6, a plurality, in this instance two carrying arms 20, are rigidly interconnected and jointly pivotable about the axis 4 of the columnar support 3. The carrying arms 20 can, however, also be individually pivotable about the axis 4.

The implement holders 2 can be arranged on the columnar support 3 so as to be extendable in a horizontal direction. For this purpose, the implement holders 2 can be, for example, for interchanging with each other, presently detachably mounted on the carrying arms 20 (FIG. 4).

As can be ascertained from FIGS. 3 and 4, at least the end of an extension arm 7 which is fastened to a wall 8 is pivotable about a vertical axis 21. Also possible is to provide for pivoting about a horizontal axis (not shown).

In the embodiment pursuant to FIG. 4, the extension arm 7 consists of two parallel arms 22 forming a parallelogram linkage, of which each is pivotable at its two ends about a vertical axis 21. The vertical pivot axis 21 can have detachable latching means 23 associated therewith for the adjusted pivoted position of the extension arm 7.

In the embodiment pursuant to FIG. 5, the end 24 of the extension arm 7 which is remote from the columnar support 3 is constructed as a carriage which is supported for reciprocation in a horizontal guide rail 25. The guide rail 25 can be mounted on a chamber wall 8 or on the chamber ceiling, or on a frame structure. As is further illustrated in FIG. 5, locking means 26 are associated with the carriage-like end 24 of the extension arm 7 and/or the guide rail 25.

As is illustrated, for example in FIG. 3, the extension arm 7 is constructed so as to be extendable in a horizontal direction. For this purpose, the extension arm 7 is constructed telescopically and is provided with a telescope tube 27, as well as a telescope arm 28 which is supported for reciprocation within the telescope tube 27. The telescope tube 27 and the telescope arm 28 each possess a rectangular cross section. In a similar manner, especially as illustrated in FIG. 6, the carrying arms 20 can be constructed so as to be telescopically extensible.

In the embodiment pursuant to FIG. 7, one of the implement holders 2 is constructed as a receiving element for a board or panel-like control or regulating element 29 constituting an implement 1. The regulating or control element 29 possesses setting or regulating and control means, as well as display components.

In the embodiment according to FIG. 8, one of the implement holders 2 is shaped as a gallows-like or bracketed receiving element 30 arranged at the upper end of the columnar support 3 for a motor 31 in this technology constituting an implement 1. The electrical current supply cable 31a leading to the motor 31 is connected by means of a socket plug 31b with the corresponding current supply element in the columnar support 3.

One of the implement holders 2 is shaped as a cantilever-like horizontal retainer element 32 at the upper end of the columnar support 3 for a horizontal illuminating member 33 constituting an implement 1. The implement holders 2 are latchable in the presently assumed pivoting position or in a preferred pivoting position. For this purpose, in the configuration of the implement holder 2 as a cantilever-like retainer element 32, this element includes a circular bearing recess 34 for the horizontally pivotable support of the columnar support 3 which is also circular in cross section. From FIG. 11, there may be further ascertained that the cantilever-like retainer element 32 possesses a double-armed latching lever 36 which is tiltable about a vertical axis 35, whose one end is pressure actuatable from externally in the sense of an effected tilting opposite to the action of a resetting spring 37 whereby, during this tilting which is effected about the axis 35, a latching element 41 is movable out of a locking position 40, which latching element is provided at the other end of the latching lever 36 and extends through an opening 38 in the edge 39 of the bearing recess 34 in the latching position, into the latching recess 40 of the columnar support 3 corresponding to the preferred pivoting position. The cantilever-like retainer element 32 is hereby of a hollow construction, whereby the latching lever 36 which is arranged interiorly of the hollow latching element 32 incorporates an externally accessible pressure element 42 for pressure actuation, such as a push-button. In order to limit the pivoting angle of the implement holder 2, which may be, for example, somewhat less than 360°, pursuant to FIG. 11, stop means 43 may be associated with the holder and the columnar support 3.

The embodiment pursuant to FIG. 10 distinguishes itself in that in the configuration of the implement holder 2 as a horizontal pivotable carrying arm 20 which supports at its free end a receiving element 11 for a technological handpiece 12, the receiving element 11 is supported on the carrying arm so as to be pivotable about a horizontal axis 44 extending transversely to the longitudinal extension of the carrying arm 20, wherein the receiving element 11 is connected in such a manner with the free end of a connecting rod 45 which has its other end fastened to the columnar support 3, that upon the displacement of the carrying arm 20 from an operative position A in which the receiving element 11 is also located in the operative position into an inoperative position B, the receiving element 11 is also automatically movable into an inoperative position through pivoting about the axis 44. In the current inoperative positions there is thus avoided any otherwise possible danger of injury through the deposited or stored implement, for example, a dental drill, and also avoided other hindrances or disruptions.

The illuminating member 33 which is arranged at the free end of the cantilever-like retainer element 32, pursuant to FIGS. 10, 12, and 13, is pivotable about a horizontal axis 46 of the retainer element which extends transversely of the longitudinal extent of the retainer element 32. In FIG. 12 there are indicated a few pivot positions through the angles α and β. In the set pivoted positions, the illuminating member 33 can be fixed by means of a latching device. For this purpose, the axle 46 is constructed hollow such that, for forming the latching arrangement 47, on the one hand, within hollow axle 46 there is arranged a pressure rod 51 provided with an inclined surface 50, which is movable opposite the effect of a resetting spring 48 by means of an externally projecting handgrip 49 from a latching position into a release position and, on the other hand, locking members 53 are supported in cutouts 52 in the hollow axle 46, which in the latching position thereof are pressed by the inclined surface 50 against the bearing wall 54 of the illuminating member 33 which encompasses the hollow axle to thereby prevent any displacement of the illuminating member which, in the released position thereof, due to the moving away of the inclined surface 50 is no longer pressed against the bearing wall 54, so as to now facilitate the displacement of the illuminating member 33. The handgrip 49 is suitably formed by a push-button. The locking members 53 are constituted of locking balls which are engageable into latching cutouts 55 in the bearing wall 54.

The inclined surface 50 is formed by a conical section of the pressure rod 51. In order to afford the supply of electrical current to the illuminating member 33 in all pivoted positions thereof, cooperating slide contacts 56 are provided on the retainer element 32 as well as on the illuminating member 33.

As is illustrated in FIG. 14, the illuminating member 33 is arranged on the retainer element 32 so as to be removable therefrom in the direction of its pivoting axis 46.

Provided on the illuminating member 33 is a protective shield 33a which is constructed of a transparent material. The protective shield 33a is pivotable about a horizontal axis 33b relative to the illuminating member 33.

The protective shield 33a, pursuant to FIG. 10, can be moved into such a position as to protect the head of a person, usually seated in front of the work table 6, from foreign bodies, for example filings or cuttings, liquids or the like produced during the finishing of workpieces. This workpiece processing primarily takes place on a work block 66, as illustrated in FIG. 10, which can be formed by a filing vice. The work block 66 can be provided with a suctioning device for aspirating grinding dust or the like. An armrest 67 is located at respectively both sides of the work block 66.

The gas burner 15 which, in accordance with FIG. 15, is arranged in the bifurcated or pan-shaped receiving element 14, possesses a regulating valve 58 which is provided with an adjusting element 57, so as to facilitate an adjustment of the gas burner from an "on" position; in effect, an operating flame, to pilot light or an "off" position.

FIGS. 15 through 18 further illustrate that with a configuration of the implement holder 2 as a horizontally pivotable carrying arm 20 which at its free end includes a receiving element 14 for the gas burner 15, the adjusting element 57 for the gas burner regulating valve 58 is connected in such a manner with the free end of a control rod 59 fixed at its other end to the columnar support 3, that upon the pivoting of the carrying arm 20 from an operative position C into an inoperative position D, the adjusting element 57 is in turn automatically movable from an operative position facilitating the full burning flame into an inoperative position which will provide only a pilot light or no flame at all. Hereby the setting or adjusting element 57 of the gas burner regulating valve 58 is guided in a latching guide 61 possessing a plurality of resilient latching positions 60. The latching guide 61, pursuant to FIG. 18, is formed by two oppositely located wavilinear latching springs 68 in conformance with the latching positions 60. Also, arranged on the carrying arm 20 is a guide track 62 for the control rod 59. The adjusting element 57 of the gas burner regulating valve 58 is formed in the type of a double-armed pivot lever which is guided in the latching guide 61

In detail, the columnar support 3 consists of a hollow stand 63 which is circular in cross section, on which bearing rings 64 carrying the carrying arms 20 are rotatably supported. These bearing rings 64 correspond to the above-mentioned individual modules 9. For its positioning on the table top 5 of a work table 6, the columnar support 3, in effect, the stand 63, incorporates socket 65 at its lower end.

What is claimed is:

1. In an equipment stand located above a table top of a work table, particularly for dental implements; including support means mounting holders for the implements arranged on said support means for receiving said implements during the nonuse thereof, the improvement comprising in that said support means mounting said implement holders is a vertically extending column comprising a hollow cylindrical support stand which is mounted to said table top to be rotatable about its longitudinal axis but to be otherwise fixedly mounted thereto, said implement holders being superimposed vertically above each other on said hollow cylindrical support stand by individual bearing rings supported thereon such that each implement holder is individually rotatable about said hollow cylindrical support stand which is mounted to said table top, and wherein at least one of the implement holders arranged at the upper end of said column support means comprises a cantilever retainer element for an illuminating member arranged at the free end of the cantilever retainer element, said illuminating member being pivotable about an axis of the retainer element extending transverse to the longitudinal extent of the retainer element to define different pivoted latching positions and being fixed through a latching means in the different pivoted latching positions, said latching means having a movable latching member engaging cooperating latching portions of the retainer element to define the different pivoted latching positions.

2. Equipment stand as claimed in claim 3, wherein said implement holders are each individually pivotable about the axis of the columnar support means.

3. Equipment stand as claimed in claim 1, wherein a plurality of said implement holders are jointly pivotable in correlation with each other about the axis of said columnar support means.

4. Equipment stand as claimed in claim 1, wherein the jointly pivotable implement holders are arranged at the same height and at a horizontal spacing from each other on said support means.

5. Equipment stand as claimed in claim 3, wherein the implement holders are latchable in the currently assumed pivoted position.

6. Equipment stand as claimed in claim 5, wherein the implement holders are latchable in a preferred pivoted position.

7. Equipment stand as claimed in claim 6, wherein, at the formation of the implement holder as a cantilevered retainer element, said element includes a circular bearing recess for the horizontally pivotable support of the support means which is also circular in cross section, the cantilevered retainer element including a double-armed latching lever tiltable about a vertical axis, whose one end is pressure-actuatable opposite the action of a resetting spring subsequent to tilting, wherein the tilting effected about the axis displaces a latching element from a latching position through openings in the edge of the bearing recess in the latched position.

8. Equipment stand as claimed in claim 7, wherein the cantilever retainer element is hollow, and the latching lever arranged interiorly of the retainer element includes an externally accessible pressure element for pressure actuation thereof.

9. Equipment stand as claimed in claim 3, wherein the implement holder and the support means include stops for limiting the pivoting angle.

10. Equipment stand as claimed in claim 1, wherein said columnar support means is hollow to facilitate the receipt of energy supply and media conductors.

11. Equipment stand as claimed in claim 1, wherein said implement holders comprise receiving elements for removable handpieces constituting the implements, for attachment of drive and supply lines.

12. Equipment stand as claimed in claim 11, wherein said receiving elements are plug-shaped elements.

13. Equipment stand as claimed in claim 11, wherein said receiving elements are bifurcated elements.

14. Equipment stand as claimed in claim 1, wherein the implement holders comprise receiving elements for removable gas burners constituting the implements.

15. Equipment stand as claimed in claim 14, wherein the receiving element is structurally combined with tablet-shaped receiver elements.

16. Equipment stand as claimed in claim 14, wherein the gas burner includes a regulating valve provided with an adjusting element.

17. Equipment stand as claimed in claim 14, wherein said receiving elements are pan-shaped elements.

18. Equipment stand as claimed in claim 1, wherein said implement holders comprise cylindrical receiver elements for extendable air nozzles constituting the implements, including a similarly extendable air supply hose.

19. Equipment stand as claimed in claim 18, wherein the cylindrical receiver elements are arranged generally at the middle of the height of the columnar support means.

20. Equipment stand as claimed in claim 1, wherein the implement holders comprise tray-shaped receiver elements for work tools and work materials constituting the implements.

21. Equipment stand as claimed in claim 1, wherein the implement holders are supported by a carrying arm on said columnar support means.

22. Equipment stand as claimed in claim 21, wherein a plurality of said carrying arm are pivotable about the axis of said columnar support means.

23. Equipment stand as claimed in claim 21, wherein the implement holders are detachably fastened on the carrying arms.

24. Equipment stand as claimed in claim 1, wherein the implement holders are mounted on the columnar support means so as to be extendable in a horizontal direction.

25. Equipment stand as claimed in claim 1, wherein at least one implement holder comprises a receiver element for a board or console-shaped regulating or control element constituting an implement.

26. Equipment stand as claimed in claim 1, wherein at least one of the implement holders located at the upper end of said columnar support means includes a bracket-shaped receiver element for a motor constituting an implement.

27. Equipment stand as claimed in claim 1, wherein the axis is constructed hollow and in forming the latching means, there is arranged in the hollow axis a pressure rod having an inclined surface displaceable against the action of a resetting spring through an externally actuatable handgrip from a latched position into a released position, and recesses in the hollow axis facilitating latching members, which in the latched position are pressed by the inclined surface against the bearing wall of the illuminating member encompassing the hollow axis to prevent pivoting of the illuminating member, and in the released position responsive to moving away of the inclined surface are released from pressing against the bearing wall so as to facilitate the displacement of the illuminating member.

28. Equipment stand as claimed in claim 27, wherein the latching members are formed by locking balls which are engageable into latching recesses in the bearing wall.

29. Equipment stand as claimed in claim 27, wherein the inclined surface is formed by a conical section of the pressure rod.

30. Equipment stand as claimed in claim 1, wherein for the supply of electrical current to the illuminating member there are provided sliding contacts for all pivoting positions on the retainer element and on the illuminating member.

31. Equipment stand as claimed in claim 1, wherein the illuminating member is arranged to be withdrawable from the retainer element along the direction of its pivoting axis.

32. Equipment stand as claimed in claim 1, wherein the illuminating member includes a protective shield consisting of a transparent material.

33. Equipment stand as claimed in claim 32, wherein the protective shield is pivotable about a horizontal axis relative to the illuminating member.

34. Equipment stand as claimed in claim 1, wherein the support means includes a socket for support thereof on the table top of said work table.

* * * * *

UNITED STATES PATENT AND TRADEMARK OFFICE
CERTIFICATE OF CORRECTION

PATENT NO. : 4,730,880
DATED : March 15, 1988
INVENTOR(S) : Helmut Schmidt, et al.

It is certified that error appears in the above-identified patent and that said Letters Patent is hereby corrected as shown below:

Column 2, line 22: illstrates" should read as --illustrates--

Column 3, line 50: "gas, burners" should read as --gas burners--

Column 7, line 40, Claim 2: "claim 3" should read as --claim 1--

Column 8, line 48, Claim 22: "carrying arm" should read as --carrying arms--

Signed and Sealed this

Twenty-seventh Day of December, 1988

Attest:

DONALD J. QUIGG

*Attesting Officer*     *Commissioner of Patents and Trademarks*